United States Patent [19]

Medina

[11] 4,374,028

[45] Feb. 15, 1983

[54] PROCESS FOR WASTE WATER PURIFICATION

[75] Inventor: Mario Medina, Matthews, N.C.

[73] Assignee: Harry Rosen, Longmeadow, Mass.

[21] Appl. No.: 311,547

[22] Filed: Oct. 15, 1981

[51] Int. Cl.³ .............................. C02F 1/24; C02F 1/42
[52] U.S. Cl. ..................................... 210/669; 210/665;
 210/685; 210/694; 210/703; 210/804
[58] Field of Search ............... 210/665, 666, 667, 669, 210/685, 686, 694, 703, 704, 705, 706, 707, 804, 806, 663

[56] References Cited

U.S. PATENT DOCUMENTS

| | | | |
|---|---|---|---|
| 2,620,926 | 12/1952 | Helbig | 210/694 |
| 2,799,645 | 7/1957 | Musgrove | 210/801 |
| 3,118,833 | 1/1964 | Reinhardt | 210/694 |
| 3,218,253 | 11/1965 | Clarke | 210/669 |
| 3,362,534 | 1/1968 | Kay | 210/801 |
| 3,408,289 | 10/1968 | Gustafson | 210/694 |
| 3,444,079 | 11/1966 | Bowers | 210/694 |
| 3,763,040 | 10/1973 | Timpe et al. | 210/694 |
| 3,781,201 | 12/1973 | Carmichael | 210/669 |
| 4,146,472 | 3/1979 | Treyssac | 210/703 |
| 4,168,228 | 9/1979 | Mallatt et al. | 210/694 |
| 4,289,505 | 9/1981 | Hardison | 210/694 |

Primary Examiner—Ernest G. Therkorn
Attorney, Agent, or Firm—Howson and Howson

[57] ABSTRACT

Disclosed is an improved process for purifying waste water in which a waste water containing contaminants, including dispersed solids, water-immiscible organic materials, and metallic cations, is first introduced to a sedimentation zone to remove water-insoluble materials having a density higher than that of water, then to a flotation zone to separate as an upper layer water-insoluble and water-immiscible materials having densities lower than that of water. The waste water stream is then introduced to an adsorption zone, where activated carbon particles are added to adsorb remaining water-insoluble and water-immiscible materials, following which the solids are removed in a liquid-solids separation zone. The aqueous phase from the last zone is then passed through a cation exchange zone to remove cations.

2 Claims, 1 Drawing Figure

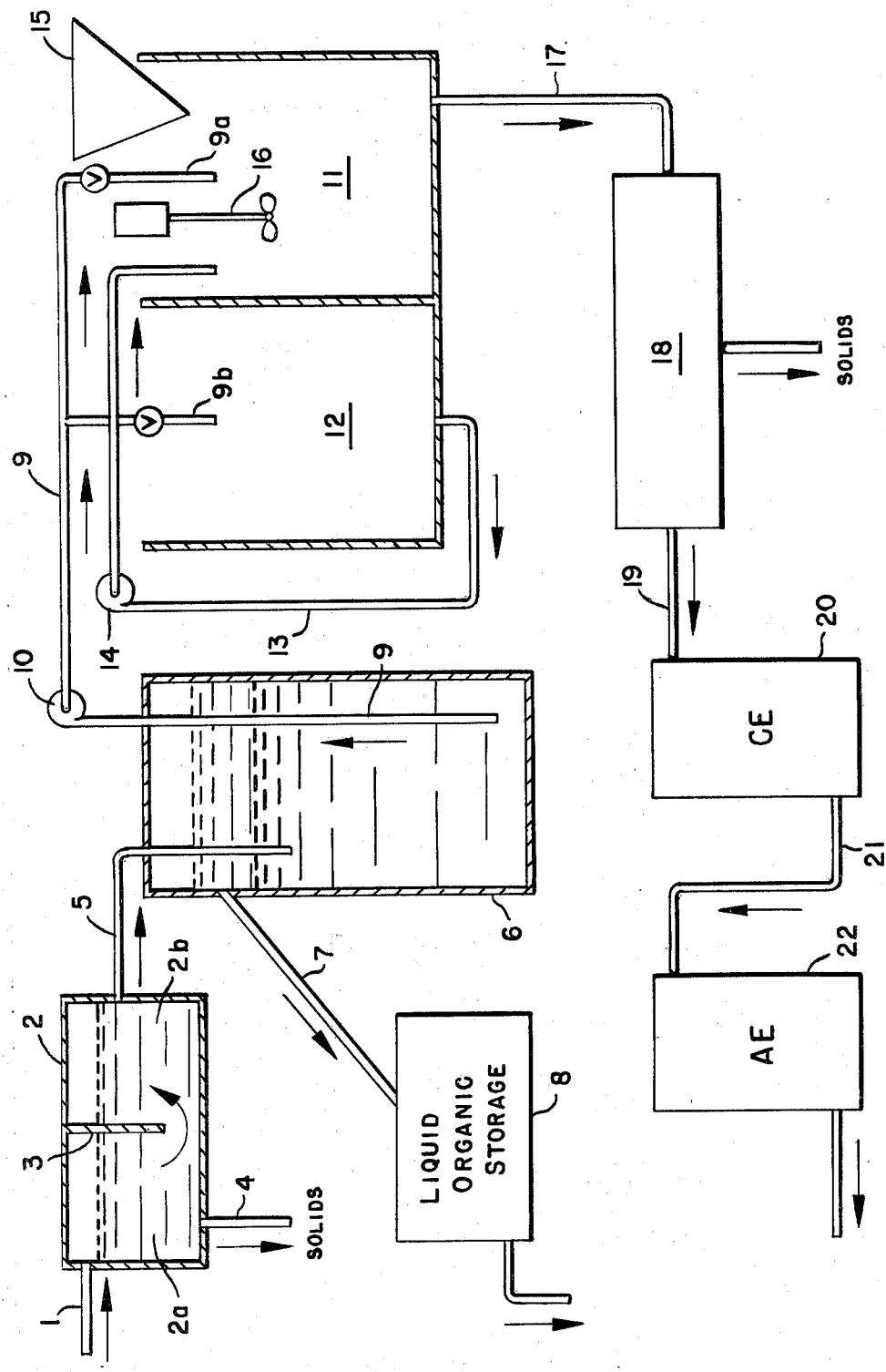

PROCESS FOR WASTE WATER PURIFICATION

BACKGROUND OF THE INVENTION

Industrial effluents, particularly waste water from chemical processes, include a broad spectrum of contaminants, the nature of which varies depending upon source. In most instances, the contaminants consist of organic materials, such as solvents, dyes, polymers, and hydrocarbons; various solids which are organic or inorganic in nature; and dissolved substances such as metal ions. Various processes have been developed which are particularly designed to remove one or more of such contaminants. Two of the common and more troublesome contaminants are organic materials such as dyes, and metal ions, and a number of methods have been suggested for their removal from industrial effluents.

It is a primary object of this invention to provide an overall process for the removal of contaminants, particularly organic materials, from industrial effluent streams.

It is another object of this invention to provide a process in which contaminating metal ions are removed from an aqueous waste stream.

These and other objects of the present invention will become apparent from the following description, appended claims, and accompanying drawing, which is a schematic representation of a waste water treating process embodying the concepts of this invention.

BRIEF DESCRIPTION OF THE INVENTION

The present invention is concerned with the purification of aqueous effluents, particularly those of industrial origin, contaminated with various of the above-mentioned organic and inorganic substances, and comprises:

A. conducting an aqueous waste stream to a first sedimentation zone provided with baffle means which divides the zone into connected inlet and outlet sections wherein water-insoluble materials of densities higher than that of water are removed from the waste stream as the bottoms from the inlet section of said zone;

B. removing said waste stream from said sedimentation zone and introducing it to a flotation zone wherein water-insoluble or immiscible materials of densities lower than that of water are removed from said waste stream as the upper layer of said zone;

C. conducting said waste stream from said flotation zone to an adsorption zone wherein there is added to said aqueous waste stream finely divided activated carbon for adsorbing water-insoluble or immiscible materials, and the resulting slurry is subjected to agitation;

D. passing said slurry through a solids separation zone wherein carbon particles having water-insoluble or immiscible materials adsorbed thereon and other solids suspended in said aqueous waste stream are separated from said waste stream; and E. conducting said aqueous waste stream to a cation exchange zone containing a cation exchange resin in the hydrogen form to remove metallic cations.

Preferably, the effluent from said cation exchange zone is conducted to an anion exchange zone containing an anion exchange resin in the hydroxide form to provide the waste stream with a substantially neutral pH and to remove contaminating anions.

DETAILED DESCRIPTION OF THE INVENTION

This invention is described in greater detail with respect to purification of the aqueous effluent from a process for making cylinder screens of nickel for use in the so-called "silk-screen" process for printing designs on textile fabrics and the like. However, it is to be understood that the water purification process of the invention can be used for the treatment of contaminated waste water from other industrial and also municipal sources.

In the manufacture of cylinder screens of nickel for silk screen printing, various chemicals, such as organic solvents, oily dyes, surfactants, and the like are used. In addition, dichromate sensitizer solutions are used, and the cylinder screen is produced by electrolysis of an aqueous nickel sulfamate solution. In view of the use of such chemicals, the waste water from the process contains oily dyes and organic solvent as well as nickel, chromate, and sulfamate ions. Purification of such effluent requires substantially complete removal of these contaminants.

Referring to the drawing, waste water is passed through line 1 to a sedimentation zone 2 comprising a rectangular chamber having an inlet section 2a and an outlet section 2b separated by a baffle 3 which extends entirely across the chamber from above the surface of the waste water, which is indicated by the wavy line, to a short distance above the bottom of the chamber. As can be seen, the water after entering the inlet section 2a passes under the baffle 3 to outlet section 2b, and is withdrawn therefrom by means of line 5, which conducts the waste water to flotation zone 6.

In the separation zone 2, by reason of the presence of the baffle 3, a substantial portion of water-insoluble solids having a density higher than that of water are removed and collected as sediment at the bottom of the inlet section 2a of the sedimentation zone 2. Such solids are removed periodically from said sedimentation zone by line 4, and may be disposed of at an approved dump site if they possess no recoverable value.

The rate of flow of the aqueous waste stream through the sedimentation zone should be relatively slow, so that quiescent conditions are approched, in order to promote precipitation of solids having a density higher than that of water.

The conduct of the aqueous waste stream from the sedimentation zone 2 to the flotation zone 6 can be by gravity flow, or can be effected by suitable pump means.

The flotation zone 6 preferably comprises a tank of corrosion-resistant material or having a liner which is resistant to corrosion. In order to promote separation and removal of water-insoluble and water-immiscible materials from the aqueous waste stream, the tank preferably is of relatively small diameter as compared to its height. By use of such a tank, a layer of substantial depth of water-insoluble and water-immiscible materials having a density less than that of water can be produced, which layer can be withdrawn periodically, as, for example, by decantation through line 7 to storage tank 8. Depending upon the particular process which is the source of the contaminated industrial effluent being treated, the decanted material may comprise valuable solvents and hydrocarbons which may be recovered and re-used.

Flotation zone 6 is provided with pipe 9 which extends vertically almost to the bottom of the tank, and is connected to a pump 10 for withdrawing the aqueous stream from the bottom layers of the aqueous phase in the flotation zone. By such arrangement, the aqueous phase can be withdrawn without creating any significant turbulence in the flotation zone, so that there is a definite interface between the aqueous phase and the non-aqueous phase, which interface is indicated by the dotted line in the drawing.

Further with regard to the flotation zone 6, the exit end of line 5 is below the interface between the aqueous and non-aqueous phases to minimize turbulence.

Flotation zone 6 can be provided with means (not shown) for activating pump 10 to remove a portion of the aqueous phase, should the interface between the two phases reach a given level above the bottom of the tank. Sensing devices of this type are well-known to those skilled in the art (see e.g. U.S. Pat. No. 2,315,017).

At the upper end of the tank comprising flotation zone 6, and a short distance below the point where the interface between the aqueous and non-aqueous phases will ordinarily be located, may be placed a relatively fine mesh screen (not shown) which extends entirely across the tank and thereby divides the flotation zone into upper and lower sections. Such screen is designed to prevent the upward movement of solids having a density lower than that of water from passing upwardly into the non-aqueous layer, whereby immiscible liquid organic materials such as organic solvents, substantially free of suspended solids, may be separated from the aqueous phase and recovered for subsequent re-use. In such an arrangement, the influent to the flotation zone 6 should enter the tank below the screen.

The aqueous stream from flotation zone 6 is pumped by means of pump 10 to adsorption zone 11 via lines 9 and 9a. Adjacent adsorption zone 11 is a holding tank 12 where excess waste water can be accumulated and stored when the adsorption zone is full. Conduct of the aqueous waste stream to the holding tank is via lines 9 and 9b. Each of lines 9a and 9b can be provided with valve means to control the flow of the aqueous waste stream into either adsorption zone 11 or holding tank 12. Liquid from the holding tank 12 can be transferred to the adsorption zone 11 by line 13 utilizing pump 14. The control of flow into adsorption zone 11 and holding tank 12 and from the latter to the former can be automatically controlled by suitable float-type liquid level sensing or other control means (not shown).

Adsorption zone 11 is provided with a hopper 15 for containing activated carbon to be added to the waste water therein. When the level of liquid in the adsorption zone 11 reaches a predetermined level, further introduction of liquid to the zone is ceased, and a metered amount of the activated carbon in hopper 15 is added to the liquid incrementally over a period of time, e.g. over about one-half hour. At the same time, agitator 16 is placed in operation to disperse the activated carbon uniformly and thoroughly throughout the liquid. Agitation of the resulting slurry can be continued over a period of time, e.g. one to two hours, to insure good contact between the activated carbon and the insoluble or immiscible contaminants in the stream.

The amount of activated carbon utilized can vary considerably, depending upon the nature and concentration of contaminants in the waste water stream. Generally, from about 10 to about 75 m of carbon per liter of waste water may be used to adsorb effectively water-insoluble and water-immiscible materials suspended in the waste water.

The activated carbon introduced to the adsorption zone is in the form of granules or powder consisting mainly of particles that pass through a No. 40 United States standard sieve, but are retained in a No. 200 standard sieve. Preferably, the granules have a particle size such that the bulk thereof pass through a No. 60 standard sieve but are retained in a No. 140 standard sieve.

The agitator means 16 may be of any suitable type, such as a motor driven impeller. A particularly useful agitator comprises a high speed disc rotating at speeds up to 12,000 ft/min. With such a device, the circulation of the fluid comprises a vertical type of turbulence, which repeatedly brings the liquid back to the disc, from which it is dispersed again radially.

The slurry from the adsorption zone 11 is then conducted via line 17 to a solids separation zone 18, wherein the particles of activated carbon having water-insoluble and water-immiscible particles adsorbed thereon and other particles dispersed in the liquid are separated to provide a clear liquid. Such liquid-solids separation can be effected by any suitable method, such as filtration, centrifugation, etc. A preferred method for effecting liquid-solids separation is filtration using a plate and frame press, the structure and operation of which type device are described in detail in *Chemical Engineer's Handbook*, McGraw-Hill (1950), pages 971 to 975.

From the liquid-solids separation zone 18, the clear waste water is conducted via line 19 to a cation exchange zone 20 which contains a cation exchange resin bed in the hydrogen form. As the waste water stream passes through the cation exchange zone 20, nickel and other cations are exchanged for hydrogen. For example:

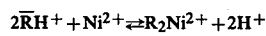

$$2\overline{R}H^+ + Ni^{2+} \rightleftharpoons \overline{R}_2Ni^{2+} + 2H^+$$

where $\overline{R}$ is the exchange resin. Preferably, the resin is of the strong acid type, which is generally a sulfonated copolymer of styrene and divinyl benzene. A useful cation exchange resin of this type is sold under the name DOW X50X8, Dow Chemical Company.

Under certain circumstances, it may be necessary or desirable also to remove from the waste water anions, such as sulfate or chloride ions, and to alter the pH of the waste water. In such instances, the waste water stream from the cation exchange zone 20 may be conducted by a line 21 to an anion exchange zone 22 which contains a bed of anion exchange resin in the hydroxide form. In passing through such a zone, hydroxide ions are exchanged with the contaminating anions, with the formation of water by reacting with the hydrogen ions resulting from ion exchange with nickel ions in the cation exchange zone. By typing up hydrogen ions in formation of water, the pH of the waste water stream may be increased, which result is particularly desirable with acidic effluents. Useful in the anion exchange zone 22 are strong base anion exchange resins, especially those based on styrene-divinyl benzene copolymers, which are classified as Types I and II. Type I is a quaternized amine product made by reaction of trimethylamine with the copolymer after chloromethylation with chloromethyl methyl ether. Type II functionality is obtained by reaction of the styrene-divinyl benzene copolymer with diethanolamine.

Fixed-bed column contactors may be used to advantage as the cation and anion exchange zones, and such equipment is well-known and available commercially. Thus, there is no need to describe such equipment in detail in this specification. Methods of regeneration of the ion exchange resins by means of acid in the case of cation exchange resins and alkali in the case of anion exchange resins are well-known, and need no description in this specification.

In some instances, the waste water stream may contain chromate ions. One method for removing and recovering chromium from such a waste stream conprises adding a reducing agent to the chromate ion-containing aqueous waste stream from the liquid-solids separation zone to precipitate chromate ions in the form of chromium (III) hydroxide, adding an alkali and aqueous hydrogen peroxide to the precipitated chromium (III) hydroxide to produce a chromate ion-containing aqueous solution, and passing the resulting solution through a hydrogen form acidic cation exchange resin (see e.g. U.S. Pat. No. 3,961,029).

The waste water from the process of this invention is relatively free of water-insoluble and water-immiscible materials, organic and inorganic, has a very low content of unwanted cations and anions, and a pH of 7 to 8. The waste water can be run into drainage fields, or collected and re-used in the chemical process which produced the waste water stream initially.

What is claimed:

1. A process for the purification of an aqueous waste stream, particularly one of industrial origin, contaminated with orangic and inorganic materials, which comprises:

(a) conducting an aqueous waste stream to a first sedimentation zone provided with baffle means which extends across said first sedimentation zone from above the surface of said waste stream to a short distance above the bottom of said first sedimentation zone, said baffle means dividing the zone into connected inlet and outlet sections wherein water-insoluble materials of densities higher than that of water are removed from the waste stream as the bottom from the inlet section of said zone;

(b) removing said waste stream from the upper portion of said sedimentation zone and introducing it to a flotation zone of relatively small diameter as compared to its height, wherein water-insoluble and water-immiscible liquid materials of densities lower than water are removed from said waste stream as the upper layer of said zone; said flotation zone comprising upper and lower sections separated by screen means, said aqueous waste stream from said sedimentation zone being introduced to said flotation zone below said screen means, said screen means preventing water-insoluble solid materials having a density lower than that of water from entering said upper layer:

(c) conducting said waste stream from said flotation zone to an adsorption zone wherein there is added to said aqueous waste stream finely divided activated carbon for adsorbing water-insoluble and water-immiscible materials, and the resulting slurry is subjected to agitation;

(d) passing said slurry through a solids separation zone wherein carbon particles having water-insoluble and water-immiscible materials adsorbed thereon and other solids suspended in said aqueous waste stream are separated from said waste stream; and (e) conducting said aqueous waste stream to a cation exchange zone containing a cation exchange resin in the hydrogen form to remove metallic cations.

2. The process according to claim 1 wherein the effluent from said cation exchange zone is conducted to an anion exchange zone containing an anion exchange resin in the hydroxide form to provide the waste stream with a substantially neutral pH and to remove contaminating anions.

* * * * *